(12) United States Patent
Zhang

(10) Patent No.: US 10,042,169 B2
(45) Date of Patent: Aug. 7, 2018

(54) MINIATURE DUST RESISTANT PROJECTION DEVICE

(71) Applicant: BEIJING PICO TECHNOLOGY CO., LTD., Beijing (CN)

(72) Inventor: Feng Zhang, Beijing (CN)

(73) Assignee: BEIJING PICO TECHNOLOGY CO., LTD, Beijing (CN)

( * ) Notice: Subject to any disclaimer, the term of this patent is extended or adjusted under 35 U.S.C. 154(b) by 41 days.

(21) Appl. No.: 15/143,035

(22) Filed: Apr. 29, 2016

(65) Prior Publication Data

US 2016/0320612 A1 Nov. 3, 2016

(30) Foreign Application Priority Data

Apr. 29, 2015 (CN) .......................... 2015 1 0213292

(51) Int. Cl.
| | |
|---|---|
| *G02B 27/01* | (2006.01) |
| *G02B 27/00* | (2006.01) |
| *G03B 21/14* | (2006.01) |
| *G02B 7/12* | (2006.01) |
| *G02B 27/22* | (2018.01) |

(52) U.S. Cl.
CPC .......... *G02B 27/0176* (2013.01); *G02B 7/12* (2013.01); *G02B 27/0006* (2013.01); *G02B 27/017* (2013.01); *G02B 27/0172* (2013.01); *G03B 21/145* (2013.01); *G02B 27/22* (2013.01); *G02B 2027/0154* (2013.01)

(58) Field of Classification Search
CPC .............. G02B 27/017; G02B 27/0176; G02B 2027/0132; G02B 2027/0134; G02B 27/0172
See application file for complete search history.

(56) References Cited

U.S. PATENT DOCUMENTS

| | | | | | |
|---|---|---|---|---|---|
| 5,915,542 | A | * | 6/1999 | Swiet ....................... | A61F 9/025 2/440 |
| 6,088,165 | A | * | 7/2000 | Janeczko .............. | G02B 23/125 250/214 VT |
| 6,144,347 | A | * | 11/2000 | Mizoguchi ......... | G02B 27/0172 345/7 |
| 6,215,460 | B1 | * | 4/2001 | Mizoguchi ......... | G02B 27/0172 345/7 |
| 8,040,292 | B2 | * | 10/2011 | Ronzani ............... | G02B 27/017 345/8 |
| 8,355,208 | B1 | * | 1/2013 | Baker ................ | G02B 27/0176 345/8 |

(Continued)

*Primary Examiner* — Bao-Luan Le
(74) *Attorney, Agent, or Firm* — Maine Cernota & Rardin

(57) ABSTRACT

The present disclosure discloses a miniature projection device comprising a housing and a display module having a lens module inside it, wherein the lens module comprises a lens barrel and a lens inside it. A front dustproof cushion is sandwiched between the lens barrel front opening edge and the display module display region frame and a rear dustproof cushion is sandwiched between the lens barrel rear opening edge and the housing window such that the lens is packaged in a sealed space enclosed by the lens barrel. The window, the display module and a display region of the display module are located in the sealed space. The dustproof structure of the miniature projection device has a high dustproof level without being affected by various openings on the housing.

9 Claims, 6 Drawing Sheets

(56) References Cited

U.S. PATENT DOCUMENTS

| | | | | |
|---|---|---|---|---|
| 8,431,881 B2* | 4/2013 | Filipovich | | G02B 23/125 250/214 VT |
| 8,605,008 B1* | 12/2013 | Prest | | G02B 27/0176 345/7 |
| 8,810,482 B2* | 8/2014 | Abdollahi | | G02B 27/0176 2/426 |
| 9,176,325 B2* | 11/2015 | Lyons | | G02B 27/0172 |
| 9,274,340 B2* | 3/2016 | Lyons | | G02B 27/0172 |
| 9,354,446 B2* | 5/2016 | Abdollahi | | G02B 27/0176 |
| 9,377,626 B2* | 6/2016 | Lyons | | G02B 27/0172 |
| 9,703,103 B2* | 7/2017 | Araki | | G02B 27/028 |
| 2002/0163486 A1* | 11/2002 | Ronzani | | G02B 27/017 345/87 |
| 2006/0168859 A1* | 8/2006 | Pombo | | G02B 7/023 40/611.07 |
| 2008/0122736 A1* | 5/2008 | Ronzani | | G02B 27/017 345/8 |
| 2008/0291120 A1* | 11/2008 | Wu | | G02B 7/002 345/8 |
| 2010/0128135 A1* | 5/2010 | Filipovich | | G02B 23/125 348/217.1 |
| 2014/0139407 A1* | 5/2014 | Abdollahi | | G02B 27/0176 345/8 |
| 2015/0009102 A1* | 1/2015 | Abdollahi | | G02B 27/0176 345/8 |
| 2015/0138645 A1* | 5/2015 | Yoo | | G02B 27/0101 359/630 |
| 2015/0234189 A1* | 8/2015 | Lyons | | G02B 27/0172 345/174 |
| 2015/0234192 A1* | 8/2015 | Lyons | | G02B 27/0172 345/8 |
| 2015/0234193 A1* | 8/2015 | Lyons | | G02B 27/0172 345/174 |
| 2015/0234501 A1* | 8/2015 | Lyons | | G02B 27/0172 345/174 |
| 2015/0235426 A1* | 8/2015 | Lyons | | G02B 27/0172 345/8 |
| 2015/0253574 A1* | 9/2015 | Thurber | | G02B 27/0172 359/630 |
| 2016/0062119 A1* | 3/2016 | Fitch | | G02B 27/0176 359/630 |
| 2017/0017085 A1* | 1/2017 | Araki | | G09G 5/00 |

* cited by examiner

MINIATURE DUST RESISTANT PROJECTION DEVICE

RELATED APPLICATIONS

This application claims the benefit of CN201510213292.1, filed Apr. 29, 2015. This application is herein incorporated by reference in its entirety for all purposes.

FIELD OF THE INVENTION

The present invention relates to the field of projection and display techniques, and particularly to a dustproof structure of a miniature projection device.

BACKGROUND OF THE INVENTION

Miniature projection devices, which are also commonly referred to as portable projection devices or pocket type projection devices, are used for displaying images and colors. The core structure of a miniature projection device is an optical display system including a display module and a lens module. Optical display systems are very sensitive to dust and pollution of optical display systems will affect the image display quality. A miniature projection device will fail to function normally if such pollution reaches a certain degree, making dustproof designs for miniature projection devices crucially important. However, development of miniature projection devices is still in its infancy, with current dustproof designs focusing on sealing of the housings and packaging of the optical display systems in the housings. Such dustproof designs are not conducive for heat dissipation and diopter and interpupillary distance adjustment typically require openings to be provided to the housing, interfering with this sealing. Therefore, to adapt to the development of miniature projection devices, dustproof structures that provide a higher level of protection from dust without restricting the provision of openings to the housings are urgently needed.

SUMMARY OF THE INVENTION

An objective of the present invention is to provide novel technical solutions for miniature projection devices to improve the dustproof level of the miniature projection devices.

One embodiment of the present invention provides a miniature projection device, comprising: a housing, a display module mounted inside the housing, and a lens module mounted inside the housing or a left lens module and a right lens module that are mounted inside the housing, the lens module being located rearwards of the display module in a front-to-rear direction, wherein the lens module comprises a lens barrel and a lens mounted inside the lens barrel; a front dustproof cushion is sandwiched between an edge of a front opening of the lens barrel and a display region frame of the display module, and a rear dustproof cushion is sandwiched between an edge of a rear opening of the lens barrel and a window of the housing, such that the lens is packaged in a sealed space enclosed by the lens barrel, the window and the display module, wherein a display region of the display module is located in the sealed space.

Another embodiment of the present invention provides such a miniature projection device wherein the front dustproof cushion and/or the rear dustproof cushion is/are made of dustproof foam, non-woven fabric or silica gel.

A further embodiment of the present invention provides such a miniature projection device wherein the front dustproof cushion and/or the rear dustproof cushion is/are of a single layer structure, respectively or of a laminated structure including at least two layers laminated together, respectively.

Yet another embodiment of the present invention provides such a miniature projection device wherein a surface of the front dustproof cushion contacting the display region frame is a plane or a curved surface, and a surface of the front dustproof cushion contacting the edge of the front opening is a plane or a curved surface; and/or a surface of the rear dustproof cushion contacting the window is a plane or a curved surface, and a surface of the rear dustproof cushion contacting the edge of the rear opening is a plane or a curved surface.

A yet further embodiment of the present invention provides such a miniature projection device wherein the miniature projection device comprises the left lens module and the right lens module, wherein the display module comprises a left display region and a right display region corresponding to the left lens module and the right lens module respectively; lens barrels of the left lens module and the right lens module are independent with respect to each other, such that a lens of the left lens module is packaged in a left sealed space enclosed by a lens barrel of the left lens module, a window at a corresponding side and the display module, the left display region being located in the left sealed space, and a lens of the right lens module is packaged in a right sealed space enclosed by a lens barrel of the right lens module, a window at a corresponding side and the display module, the right display region being located in the right sealed space.

Still another embodiment of the present invention provides such a miniature projection device wherein the miniature projection device comprises the left lens module and the right lens module, wherein the display module comprises a left display region and a right display region corresponding to the left lens module and the right lens module respectively; a light barrier is provided between the left and right display regions of the display module; lens barrels of the left lens module and the right lens module are provided with recesses to match with the light barrier; recess frames of the lens barrels are overlapped with each other in the front-to-rear direction such that the lens barrels run through at their respective recess frames; and an intermediate dustproof cushion is provided between the recess frames of the lens barrels.

A still further embodiment of the present invention provides such a miniature projection device wherein the lens module comprises at least two lens assemblies connected in serial from a front side to a rear side; the lens assembly comprises a assembly lens barrel and a lens mounted inside the assembly lens barrel; all the assembly lens barrels are sequentially fitted over one another to form the lens barrel; and a dustproof ring is provided between adjacent assembly lens barrels.

Even another embodiment of the present invention provides such a miniature projection device further comprising a diopter adjusting mechanism configured to drive the display module to slide in the front-to-rear direction; wherein among all the assembly lens barrels that are connected in serial to form the lens barrel, at least one assembly lens barrel from the assembly lens barrel at the front-most position forms a movable lens barrel of the lens barrel, and the remaining assembly lens barrels form a fixed lens barrel of the lens barrel, the movable lens barrel being fixedly mounted to the display module along the front-to-rear direction, and the fixed lens barrel being fixedly mounted to the housing along the front-to-rear direction; an overlapped width that allows the fixed and movable lens barrels to sleeve one another meets the following condition: when the movable lens barrel moves to the front-most position together with the display module, the dustproof ring between the fixed and movable lens barrels remains a state of being sandwiched between the fixed and movable lens barrels.

An even further embodiment of the present invention provides such a miniature projection device further comprising a diopter adjusting mechanism configured to drive the display module to slide in the front-to-rear direction; wherein the lens module is fixedly mounted to the housing along the front-to-rear direction; a thickness of the front dustproof cushion in the front-to-rear direction meets the following condition: when the display module moves to the frontmost position, the front dustproof cushion remains a state of being sandwiched between the edge of the front opening of the lens barrel and the display region frame of the display module.

A still even another embodiment of the present invention provides such a miniature projection device wherein the miniature projection device comprises the left lens module and the right lens module, wherein the display module comprises a left display region and a right display region corresponding to the left lens module and the right lens module respectively; and wherein the miniature projection device further comprises an interpupillary distance adjusting mechanism configured to drive the left lens module and the right lens module to move in a left and right direction.

A still even further embodiment of the present invention provides such a miniature projection device wherein the diopter adjusting mechanism comprises an adjusting thumbwheel and a transmission assembly that converts rotational motion into linear motion, wherein the transmission assembly is mounted between the adjusting thumbwheel and the display module such that rotation of the adjusting thumbwheel drives the display module to slide in a front and back direction.

Still yet another embodiment of the present invention provides such a miniature projection device wherein the interpupillary distance adjusting mechanism comprises two interpupillary distance adjusting sub-mechanisms, wherein one of the interpupillary distance adjusting sub-mechanisms drives the left lens module to slide in a left and right direction, and the other one thereof drives the right lens module to slide in a left and right direction.

The inventor(s) of the present invention find(s) that most miniature projection devices of the prior arts have lower dustproof levels, and dustproof designs are basically limited to the housings so that development of the functions of the miniature projection devices is restricted. Therefore, the technical problem to be solved by the present invention is not anticipated by those skilled in the art, and the present invention includes novel technical solutions. By forming a dustproof structure that can package the lens and the corresponding display region in a sealed space enclosed by the lens barrel, the window and the display module, the present invention can effectively protect the optical display system of the miniature projection device against pollution of dust. The dustproof structure of the present invention has a higher dustproof level and will not be affected by the housing provided with various openings.

Other features and advantages of the present invention will become apparent through the detailed description of the embodiments of this invention with reference to the drawings.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
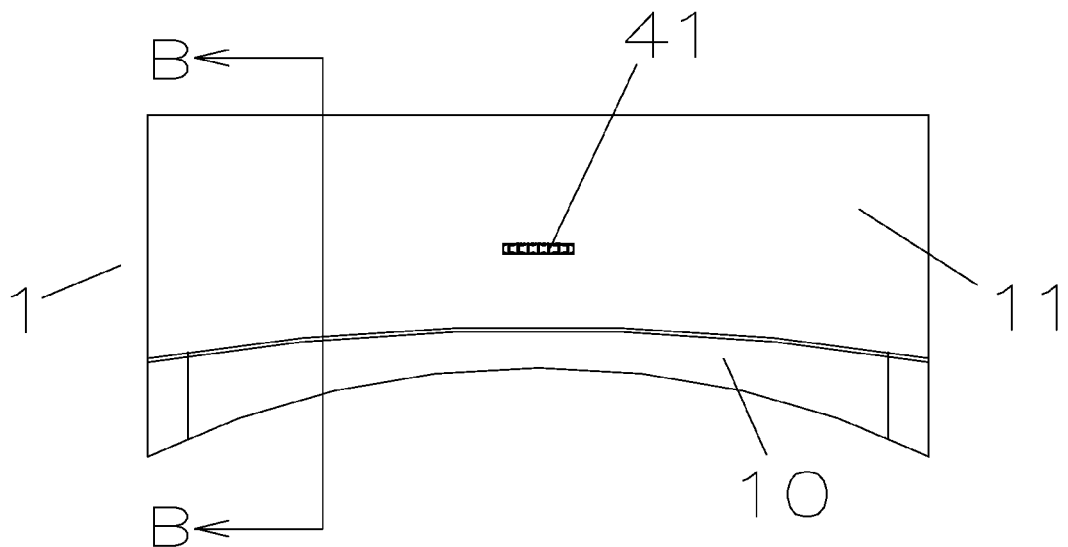
FIG. 1 is a schematic plan view of an embodiment of the miniature projection device of the present invention.
Figure 2:
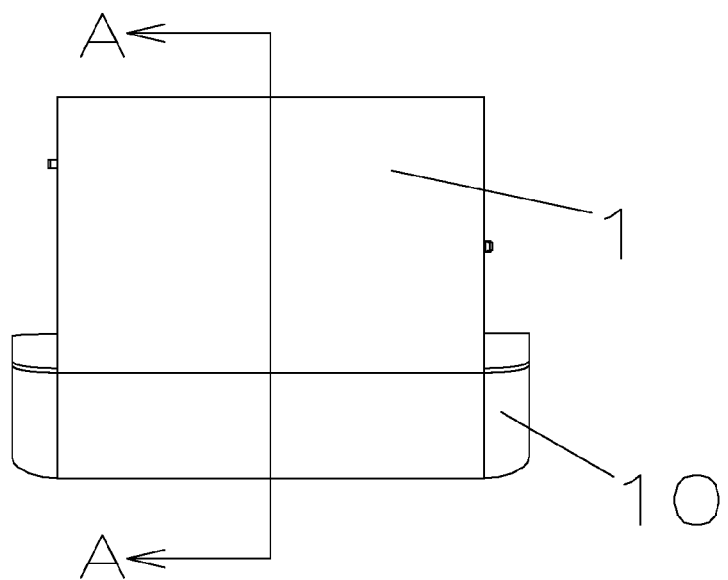
FIG. 2 is a schematic left view of the miniature projection device shown in FIG. 1.
Figure 3:
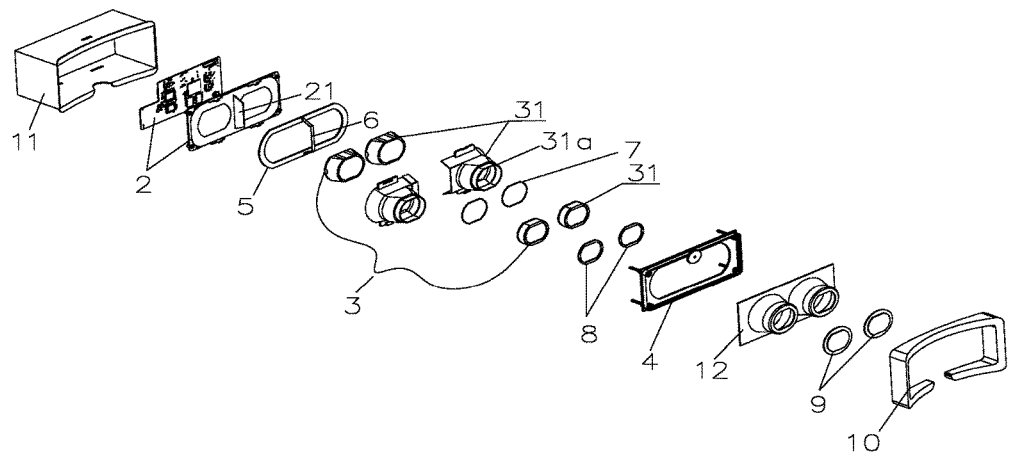
FIG. 3 is a schematic decomposition view of the miniature projection device shown in FIGS. 1 and 2.

Now, various embodiments of this invention will be described in detail with reference to the drawings. It should be noted that, unless specified otherwise, the arrangements of the members and steps, the mathematical formulas and numerical values described in these embodiments do not restrict the scope of the invention.

The following descriptions for at least one embodiment are actually descriptive only, and shall not be intended to limit the invention and any application or use thereof.

The techniques, methods and devices well known to those skilled in the related arts may not be discussed in detail. However, where applicable, such techniques, methods and devices should be deemed a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

To solve the problem that miniature projection devices of the prior art have lower dustproof levels so that development of the functions of the miniature projection devices is restricted, the present invention provides a miniature projection device of a higher dustproof level. As shown in FIGS. 1-8, the miniature projection device comprises: a housing 1, a display module 2 mounted inside the housing 1, and a lens module 3 mounted inside the housing 1 or a left lens module 3 and a right lens module 3 that are mounted inside the housing 1, wherein when one lens module 3 is provided, two-dimensional display can be performed; when the left and right lens modules 3 are provided, three-dimensional display can be performed; the lens module 3 is located rearwards of the display module 2 in a front-to-rear direction and at a front side of a window 9 provided on the housing 1 in a front-to-rear direction, such that light emitted from a display region of the display module 2 can reach the window 9 provided on the housing 1 after passing through the lens module 3; the lens module 3 comprises a lens barrel 3a and a lens 3b mounted inside the lens barrel 3a; a front dustproof cushion 5 is sandwiched between an edge 3c of a front opening of the lens barrel 3a and a display region frame of the display module 2 (the display region frame refers to the periphery of the display region of the display module 2), and a rear dustproof cushion 8 is sandwiched between an edge 3d of a rear opening of the lens barrel 3a and the window 9 of the housing 1, such that the lens 3b is packaged in a sealed space enclosed by the lens barrel 3a, the window 9 and the display module 2, wherein the display region of the display module 2 is located in the sealed space. Through the above structure, all the lenses 3b of the miniature projection device and the display region can be effectively protected against dust pollution. As such a dustproof structure is realized by the structure of the optical display system itself, and the dustproof effect will not be affected by the openings provided to the housing 1. Therefore, heat dissipation designs, diopter and interpupillary distance adjustment designs that require openings to be provided to the housing can be realized for the miniature projection device, facilitating upgrading of the functions of the product.

The display module 2 can be tailored according to the needs, or may employ any existing display products, such as a cell phone, a tablet computer, an electronic reader or the like.

The above-described lens module 3 may employ a basic optical structure. Namely, the lens module 3 may only include one lens 3b which is a convex lens. However, to realize optical designs such as chromatic aberration elimination, image distortion elimination, amplification of viewing angles and the like, the lens module 3 will include at least two lenses 3b, which may be installed in an integral lens barrel 3a or in separate lens barrels to facilitate assembly of the lens module 3 and facilitate diopter adjustment. Take an example in which an optical design of chromatic aberration elimination is provided. As shown in FIGS. 3-6, the lens module 3 may include two lenses 3b provided in the lens barrels 3a; the lens close to the display module 2 is provided as a concave lens; the lens close to the window 9 is a convex lens, such that color distortion can be avoided through a chromatic aberration complementation effect of positive and negative lenses.

FIGS. 3-8 respectively show that at least two lenses are separately provided in individual lens barrels. The lens module 3 may include at least two lens assemblies 31 connected in serial. The lens assembly 31 includes assembly lens barrels 31a and a lens installed in the assembly lens barrels 31a. All the assembly lens barrels 31a are sequentially fitted over one another to form the lens barrel 3a. A dustproof ring 7 is provided between adjacent assembly lens barrels 31a so that a sealing effect is realized for the whole lens barrel. FIGS. 3-6 respectively show an embodiment in which the above structure is combined with an optical design for chromatic aberration elimination. Specifically, the lens module 3 includes two lens assemblies 31. The lens assembly 31 close to the display module 2 is provided with a concave lens therein; and the lens assembly 31 close to the window 9 is provided with a convex lens therein.

Figure 8:
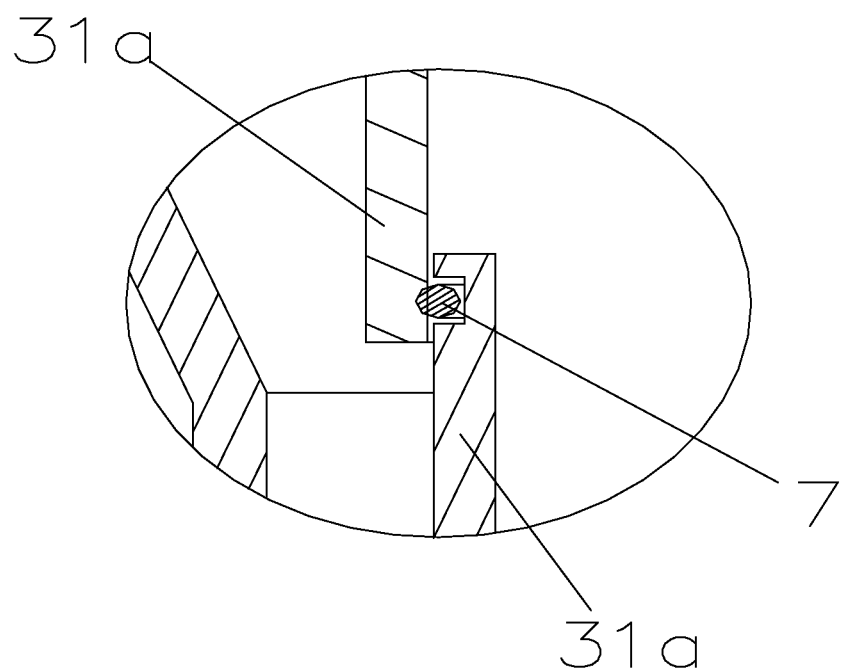
FIG. 8 is a local exploded schematic view at F2 in FIG. 6.

As shown in FIG. 8, to facilitate mounting of the dustproof ring 7, a sealing passage may be provided to a barrel wall of one of the adjacent lens assemblies 31, and the dustproof ring 7 may be installed in the corresponding sealing passage. According to the operation habits of operators, the sealing passage may be provided to a barrel wall of the inner lens assembly after the adjacent lens assemblies 31 are fitted over one another. The structure of the dustproof ring 7 can facilitate sliding of the adjacent lens assemblies 31 in the front-to-rear direction. Such a structure can effectively prevent rolling or even releasing of the dustproof ring 7 when the adjacent lens assemblies 31 slide relative to one another.

As shown in FIGS. 3-8, the miniature projection device of the present invention comprises a left lens module 3 and a right lens module 3. A display module 2 comprises a left display region and a right display region corresponding to the left lens module and the right lens module respectively. The two display regions may be realized by one display screen with separate display regions or by two display screens. Lens barrels 3a of the two lens modules 3 are independent with respect to each other so that the lens barrels 3a can be formed with sealed barrel walls, whereby the above sealed spaces can be formed. Thus, a lens 3b of the left lens module 3 is packaged in a left sealed space enclosed by a lens barrel 3a of the left lens module 3, a window 9 at a corresponding side and the display module 2, the left display region being located in the left sealed space, and a lens 3b of the right lens module 3 is packaged in a right sealed space enclosed by a lens barrel 3a of the right lens module 3, a window 9 at a corresponding side and the display module 2, the right display region being located in the right sealed space.

In this embodiment, light blocking of the two display regions of the miniature projection device is realized by the lens barrels 3a of the two lens modules 3. When such a light blocking structure is used in combination with an interpupillary distance adjusting structure, an area that the edge 3c of the front opening of the lens barrel 3a covers a corresponding display region frame of the display module 2 should meet the requirements for an interpupillary distance adjustment range. To lower such requirements, the present disclosure provides an additional embodiment below.

As shown in FIGS. 3-10, the miniature projection device of the present invention comprises a left lens module 3 and a right lens module 3. A display module 2 comprises a left display region and a right display region corresponding to the left lens module and the right lens module respectively. A light barrier 21 is provided between the left and right display regions of the display module 2; lens barrels 3a of the left lens module 3 and the right lens module 3 are provided with recesses 3a1 to match with the light barrier 21; and recess frames 3a2 of the two lens barrels 3a are overlapped with each other in the front-to-rear direction such that the two lens barrels 3a run through at their respective recess frames 3a2. An intermediate dustproof cushion 6 is provided between the recess frames 3a2 of the lens barrels 3a to seal an overlapped position of the two lens barrels 3a. In this embodiment, all the lenses 3b are packaged in a sealed space enclosed by the display module 2, two display windows 9 and the two lens barrels 3a that run through with each other, and both display regions are located in the sealed space. To realize a sealing effect, both ends of the intermediate dustproof cushion 6 are at least leveled with the edges 3c of the front openings of the lens barrels 3a. In this way, the intermediate dustproof cushion 6 can closely contact the front dustproof cushion 5 to realize the sealing effect. When this embodiment is used in combination with an interpupillary distance adjusting structure, a width that the recess frames 3a2 of the two lens barrels 3a are overlapped with each other in the front-to-rear direction should meet the requirements for an interpupillary distance adjustment range.

Figure 9:
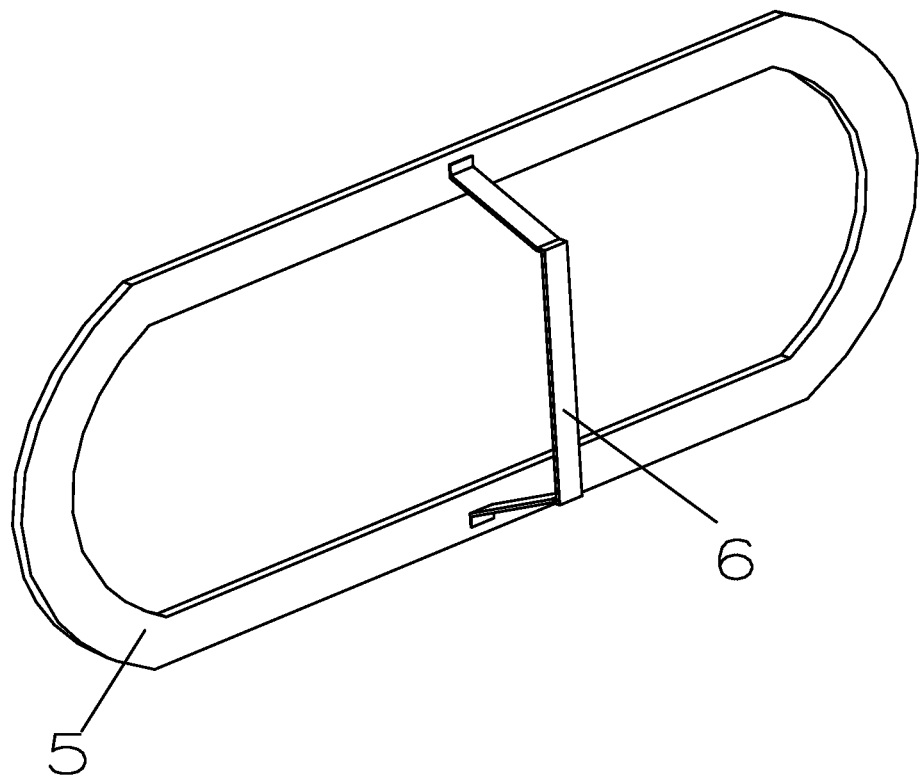
FIG. 9 is a schematic structure view of an embodiment of the front dustproof cushion and the intermediate dustproof cushion.

In this embodiment, as the two lens barrels 3a run through at their respective recess frames 3a2, the edges 3c of the front openings of the lens barrels 3a are connected with each other to form an annular front opening edge. As shown in FIG. 9, the front dustproof cushion 5 may employ a shape that matches with the annular front opening edge.

The front dustproof cushion 5, the rear dustproof cushion 8 and the dustproof ring 7 may be made of highly elastic dustproof materials with low friction, such as dustproof foam, non-woven fabric or silica gel and so on. The front dustproof cushion 5, the rear dustproof cushion 8 and the dustproof ring 7 may be of a single layer structure respectively or of a laminated structure including at least two layers laminated together respectively.

In addition, a surface of the front dustproof cushion 5 contacting the display region frame may be a plane or a curved surface, and a surface of the front dustproof cushion 5 contacting the edge 3c of the front opening may be a plane or a curved surface. A surface of the rear dustproof cushion 8 contacting the window 9 may be a plane or a curved surface, and a surface of the rear dustproof cushion 8 contacting the edge 3d of the rear opening may be a plane or a curved surface. Similarly, a surface of the dustproof ring 7 contacting adjacent two assembly lens barrels 31a may be a plane or a curved surface.

By applying the above dustproof designs of the miniature projection device of the present invention, the miniature projection device of the present invention can be provided with various heat dissipation designs, diopter and interpupillary distance adjustment designs that require openings to be provided to the housing 1. The followings describe embodiments with diopter and interpupillary distance adjustment designs.

Figure 4:
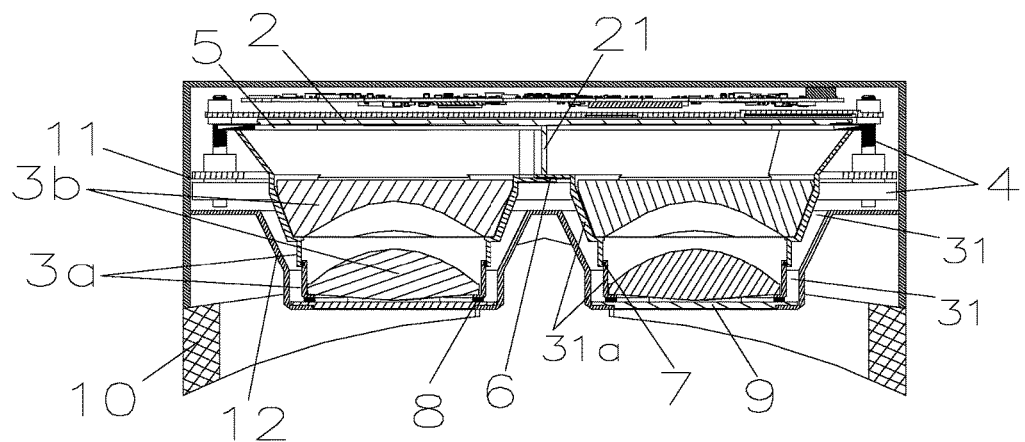
FIG. 4 is a schematic sectional view cut along the A-A direction in FIG. 2.
Figure 5:
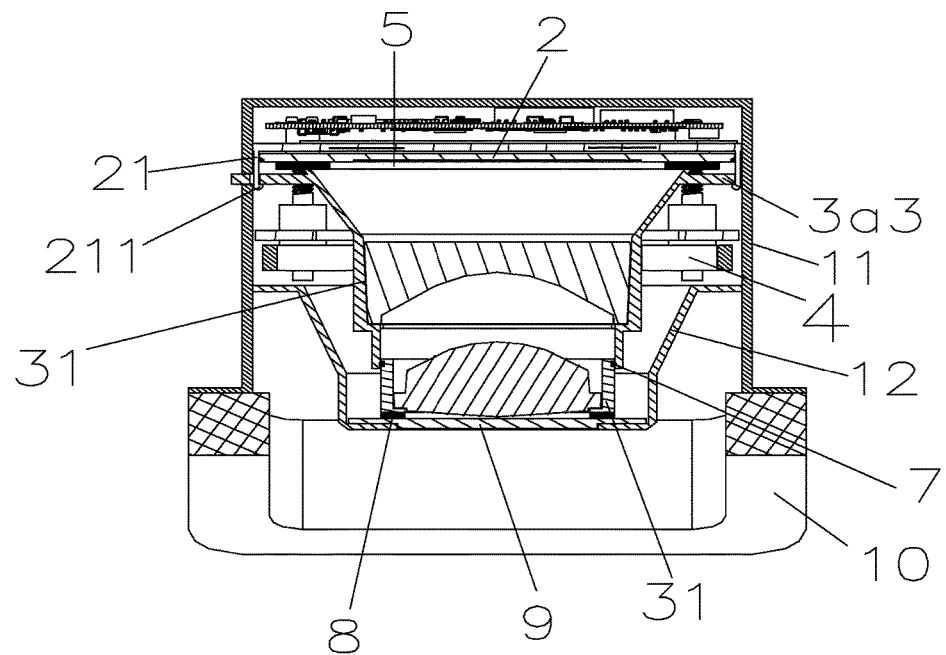
FIG. 5 is a schematic sectional view cut along the B-B direction in FIG. 1.
Figure 6:
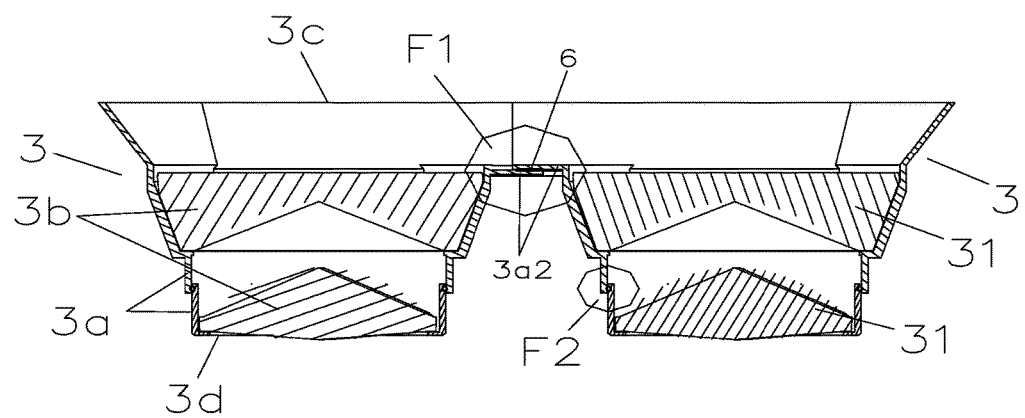
FIG. 6 is a schematic sectional view of the lens barrel shown in FIG. 4 cut along the A-A direction in FIG. 2.
Figure 7:
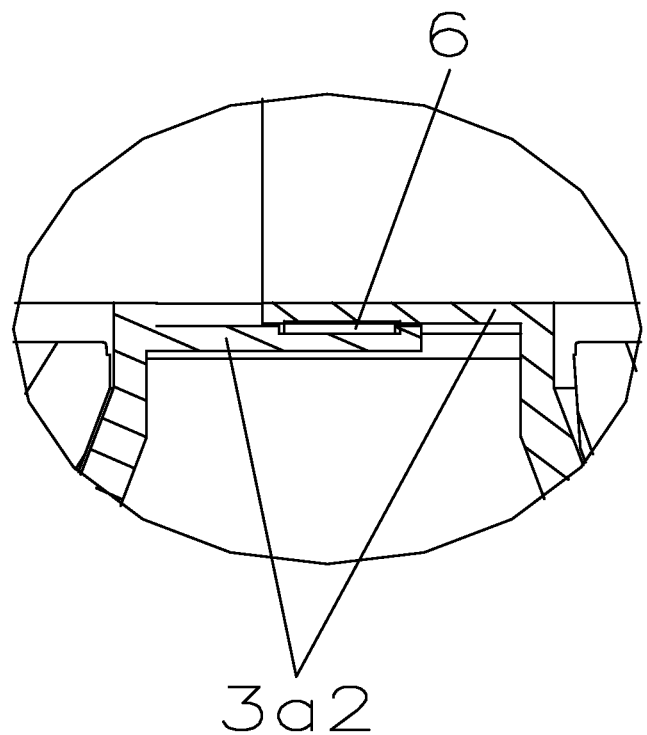
FIG. 7 is a local exploded schematic view at F1 in FIG. 6.
Figure 10:
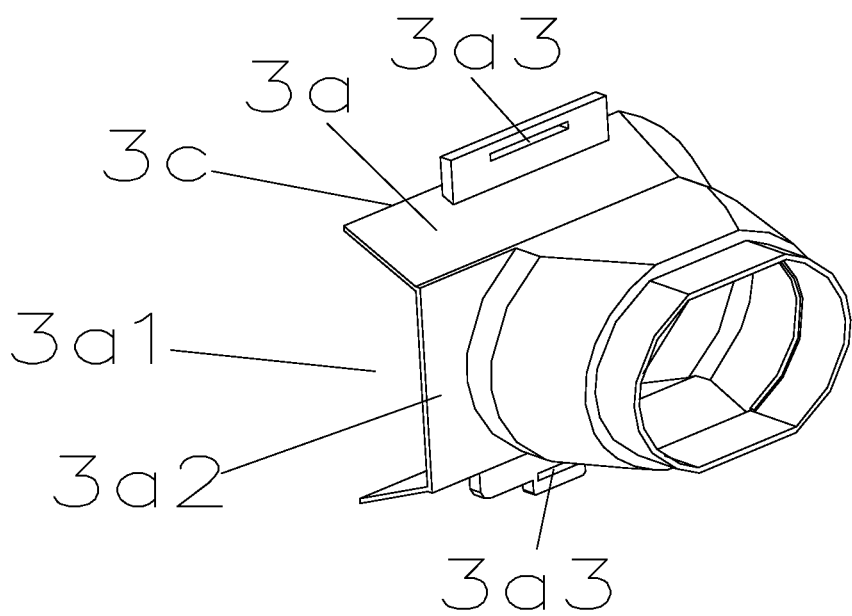
FIG. 10 is a partial schematic structure view of the lens module of FIGS. 3-6.

The miniature projection device of the present invention comprises a diopter adjusting mechanism 4 configured to drive the display module 2 to slide in the front-to-rear direction. The lens module 3 is fixedly mounted to the housing 1 along the front-to-rear direction. The syntactical structure in this application that "A" is fixedly mounted to "B" in the front-to-rear direction only defines that "A" can slide relative to "B" in the front-to-rear direction, but does not define the freedom of "A" relative to "B" in other directions. For example, "A" may slide in a left and right direction relative to "B". Therefore, a thickness of the front dustproof cushion 5 in the front-to-rear direction should meet the following condition: when the diopter adjusting mechanism 4 drives the display module 2 to move to the front-most position, the front dustproof cushion 5 remains a state of being sandwiched between the edge of the front opening of the lens barrel 3a and the display region frame of the display module 2. The front-most position may be restricted by a position limiting structure, such that when the display module 2 moves to the front-most position, a user may be prompted that an operation limit has been reached. The position limiting structure may be a position limiting member provided at the front-most position. The position limiting structure may be provided as shown in FIGS. 4, 5 and 10: a pull rod 21 is provided to the display module 2; a through groove 3a3 is provided to a lateral side of the lens barrel 3a; the pull rod 21 pass through the through groove 3a3; an end of the pull rod 21 is provided with a hook 211; when the hook 211 hooks the periphery of the through groove 3a3 rearwards of the through groove 3a3, the display module 2 cannot move forwards, or the display module 2 has reached the above front-most position. When the above position limiting structure is used in combination with interpupillary distance adjustment designs, a gap between the pull rod 21 and the through groove 3a3 in the left and right direction should meet the requirements for the interpupillary distance adjustment range.

To realize the best diopter adjustment design, the miniature projection device of the present invention further proposes a solution of dividing the lens barrel 3a into a movable lens barrel and a fixed lens barrel. Specifically, among all the assembly lens barrels 31a of the lens barrel 3a, at least one assembly lens barrel from the assembly lens barrel at the front-most position forms a movable lens barrel of the lens barrel 3a, and the remaining assembly lens barrels form a fixed lens barrel of the lens barrel 3a. The movable lens barrel is fixedly mounted to the display module 2 along the front-to-rear direction, such that the movable lens barrel can move together with the display module 2 along the front-to-rear direction under driving of the diopter adjusting mechanism 4. The fixed lens barrel is fixedly mounted to the housing 1 along the front-to-rear direction. In this way, when performing diopter adjustment, the movable lens barrel slides relative to the fixed lens barrel along the front-to-rear direction, such that a gap between the lens in the fixed lens barrel and the lens in the movable lens barrel can be adjusted. By applying the above diopter adjustment design, the best diopter adjustment solution may be selected in the design stage. For that purpose, an overlapped width that allows the fixed and movable lens barrels to sleeve one another meets the requirements for the diopter adjustment range; specifically, the following condition should be met: when the movable lens barrel moves to the front-most position together with the display module 2, the dustproof ring 7 between the fixed and movable lens barrels remains a state of being sandwiched between the fixed and movable lens barrels. When the above structure is combined with the structure for chromatic aberration elimination design, the assembly lens barrel 31a including a concave lens is the movable lens barrel, and the assembly lens barrel 31a including a convex lens is the fixed lens barrel.

When fixedly mounting the movable lens barrel to the display module 2 along the front-to-rear direction, the above pull rod 21 may be used to cooperate with the through groove 3a3. If the hook 211 hooks the periphery of the through groove 3a3 at the rear side of the through groove 3a3, and includes a push member provided in front of the through groove 3a3 and abutting against the periphery of the through groove 3a3, when the display module 2 slides forwards, the hook 211 pulls the fixed lens barrel to slide forwards together; and when the display module 2 slides backwards, the push member pushes the fixed lens barrel to slide backwards together.

As shown in FIGS. 1-5 and 11, the diopter adjusting mechanism 4 may comprise an adjusting thumbwheel 41 and a transmission assembly 42 that converts rotational motion into linear motion, wherein the adjusting thumbwheel 41 is exposed through the housing 1 such that the user can perform diopter adjusting operations, and the transmission assembly 42 is mounted between the adjusting thumbwheel 41 and the display module 2 such that rotation of the adjusting thumbwheel 41 drives the display module 2 to move forwards or backwards.

Figure 11:
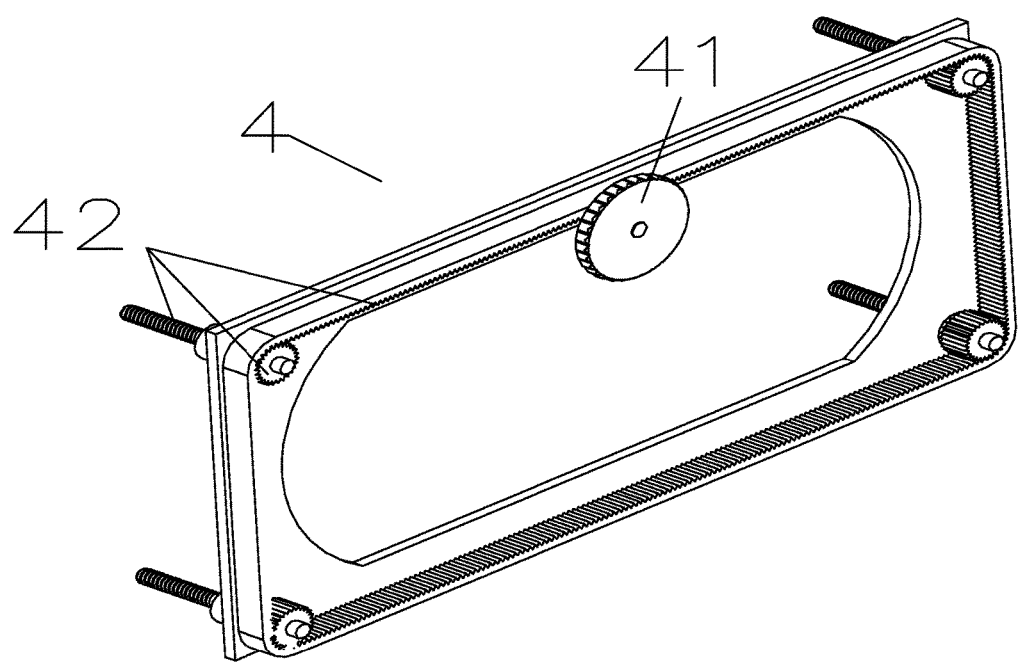
FIG. 11 is a schematic structure view of an embodiment of the diopter adjusting mechanism of FIGS. 3-5.

As shown in FIG. 11, the transmission assembly 42 may comprise a drive wheel mounted on the adjusting thumbwheel 41, a pulley meshed with the drive wheel, a driven wheel meshed with the pulley, and a screw fixedly connected to the driven wheel and connected to the display module 2 by thread fitting. When the adjusting thumbwheel 41 is driven, the drive wheel drives the screw to rotate via the driven wheel, such that the display module 2 is driven to move forwards or backwards. At least two screws may be used, such that motion linearity of the display module 2 can be ensured, and a connecting structure through sliding cooperation between the housing 1 and the display module 2 can be saved.

The transmission assembly 42 may comprise a gear system driven by the adjusting thumbwheel 41. The mounting shaft of the final stage gear of the gear system is arranged in the left and right direction. The display module 2 is fixedly mounted with a transmission member to cooperate with the final stage gear, such that the final stage gear drives the display module 2 to slide forwards or backwards via the transmission member. In this way, when the user drives the adjusting thumbwheel 41, the adjusting thumbwheel 41 can drive the display module 2 to slide forwards or backwards via the gear system and the transmission member.

The transmission member may be a rack meshed with the final stage gear. For such a structure, the adjusting thumbwheel 41 may drive the gear system to move through a worm and gear transmission pair, such that self-locking of the diopter adjustment is realized by the self-locking property of the worm and gear transmission pair. Another structure for realizing self-locking may be provided as below: a cam groove such as an involute cam groove may be provided to the final stage gear; the transmission member may be a sliding post matching with the cam groove; in this way, when the cam groove rotates along with the final stage gear, the transmission member can slide along the cam groove to drive the display module 2 to slide forwards or backwards.

To better accommodate the miniature projection device of the present invention to all interpupillary distances, embodiments of the miniature projection device of the present invention comprise a left lens module 3 and a right lens module 3. A display module 2 comprises a left display region and a right display region corresponding to the left lens module and the right lens module respectively. The miniature projection device further comprises an interpupillary distance adjusting mechanism configured to drive the left lens module 3 and the right lens module 3 to move along a left and right direction, wherein the left and right direction is orthogonal to the front-to-rear direction on a horizontal plane.

To ensure the linearity of interpupillary distance adjustment, for a miniature projection device without a diopter adjusting function or a miniature projection device that realizes diopter adjustment by driving the display module 2 to slide forwards or backwards as described in Embodiment 4, the lens module 3 may be connected with the housing 1 by sliding cooperation in the left and right direction. Such connection by sliding cooperation may be realized by a structure of a sliding groove cooperating with a sliding track or by a structure of a guiding post cooperating with a guiding hole, for example. For a miniature projection device that realizes diopter adjustment by driving the display module 2 to slide forwards or backwards together with the movable lens barrel as described above, the movable lens barrel may be connected with the display module 2 by sliding cooperation in the left and right direction. Such connection by sliding cooperation may be realized by a structure of the above pull rod 21 in sliding cooperation with the through groove 3a3 in the left and right direction. The above fixed lens barrel may be connected with the housing 1 by sliding cooperation in the left and right direction.

The interpupillary distance adjusting mechanism may comprise an interpupillary distance adjusting thumbwheel, a gear driven by the interpupillary distance adjusting thumbwheel and two racks meshed with the gear, wherein the interpupillary distance adjusting thumbwheel may be rotatably installed to the housing 1 by a rotating shaft that is arranged in a vertical direction orthogonal to the front-to-rear direction and the left and right direction; the gear is fixedly installed to the rotating shaft; one of the rack is meshed with the gear at a front side of the gear, the other rack is meshed with the gear at a rear side of the gear; one of the rack is fixedly installed to the left lens barrel 3a, and the other rack is fixedly installed to the right lens barrel 3a. In this way, by driving the interpupillary distance adjusting thumbwheel, the user can drive the left and right lens modules 3 to move towards or away from each other so as to adjust the interpupillary distance of the left and right lens modules 3.

The above interpupillary distance adjusting mechanism can only drive the left and right lens modules 3 to move towards or away from each other. Therefore, the interpupillary distance adjusting mechanism has some constraints in application. To enlarge the applicable range of the lens module of the present invention for interpupillary distances, the interpupillary distance adjusting mechanism may comprise two interpupillary distance adjusting sub-mechanisms, wherein one of the interpupillary distance adjusting sub-mechanisms drives the left lens module 3 to slide in a left and right direction, and the other one thereof drives the right lens module 3 to slide in a left and right direction, such that the user can adjust the left and right lens modules 3 separately. The interpupillary distance adjusting sub-mechanism may be realized by the following structure, for example: the above interpupillary distance adjusting thumbwheel may be used, and the gear may be used to drive the rack, such that the corresponding lens module 3 can be driven to slide.

To enable the interpupillary distance adjusting sub-mechanism to have a self-locking function, the interpupillary distance adjusting sub-mechanism may comprise a sliding assembly and a locking assembly, wherein the sliding assembly comprises a sliding member fixedly connected to the lens barrel 3a of a corresponding lens module 3, and an interpupillary distance adjusting slide button fixedly connected to the sliding member and exposed to the outside through the housing; the locking assembly comprises a locking member and an elastic member, the locking member being mounted to the display module 2 or the housing 1 through the elastic member. Specifically, for a miniature projection device without a diopter adjusting function or a miniature projection device that realizes diopter adjustment by driving the display module 2 to slide forwards or backwards as described in Embodiment 4, the locking member is mounted to the housing 1 or a bracket fixedly connected to the housing 1; for a miniature projection device that realizes diopter adjustment by driving the display module 2 to slide forwards or backwards together with the movable lens barrel as described in Embodiment 4, if the sliding member is fixedly connected to the movable lens barrel, the locking member will be provided to the display module 2; if the sliding member is fixedly connected to the fixed lens barrel, the locking member will be provided to the housing 1 or the bracket fixedly connected to the housing 1; and a surface of the sliding member is provided with a row of locking grooves arranged along the left and right direction to match with the locking member. In this way, user the user drives the interpupillary distance adjusting slide button, the sliding member can be driven to slide along the left and right direction. When the sliding member is driven by a force to slide, the locking grooves press the elastic member through the locking member, such that the locking member is released from the locking grooves, thereby realizing unlocking. When the sliding member moves to a position where the locking member faces the next locking groove in the direction of the pushing force, the locking member extends into the next locking groove under a force applied by the elastic member, thereby realizing locking.

To conveniently guide the locking member into and out of the locking groove, a surface of the locking groove may be formed with a guiding bevel. For example, a section of the locking groove in the vertical plane may be V shaped or semi-circular or the like. The vertical plane is a plane parallel with the left and right direction and perpendicular to the front-to-rear direction.

The miniature projection device of the present invention may be a device that is usually used on a desk or a head-mounted projection device (or a head-mounted display). As a head-mounted projection device, the front-to-rear and left and right directions are defined relative to the orientation of the head-mounted display in the use state. A direction in front of the user and close to the face of the user may be the rear direction, and a direction in front of the user and away from the face of the user may be the front direction.

To facilitate mounting of the above display module 2 and the lens module 3, as shown in FIGS. 1-5, the housing 1 may include a front housing 11 and a rear housing 12. When the front and rear housings 11, 12 are snap-fitted, the housing 1 is formed. In addition, when the miniature projection device of the present invention is a head-mounted projection device, as shown in FIGS. 1-5, the miniature projection device may be provided with facing foam 10 to improve comfort when in use.

In addition, the above embodiments mainly focus on the differences relative to other embodiments. Those skilled in the art shall clearly understand that the above embodiments may be applied individually or in combination.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A miniature projection device comprising:
a housing;
a display module mounted inside the housing; and
a lens module mounted inside the housing or a left lens module and a right lens module that are mounted inside the housing, wherein the lens module is located rearwards of the display module in a front-to-rear direction, wherein the lens module comprises:
a lens barrel and a lens mounted inside the lens barrel;
a front dustproof cushion sandwiched between an edge of a front opening of the lens barrel and a display region frame of the display module; and
a rear dustproof cushion sandwiched between an edge of a rear opening of the lens barrel and a window of the housing, such that the lens is packaged in a sealed space enclosed by the lens barrel, the window and the display module,
wherein a display region of the display module is located in the sealed space,
wherein said dustproof cushions create a dustproof seal between the components between which they are sandwiched,
wherein said sealed space enclosed by the lens barrel, the window and the display module is effectively completely sealed from dust intrusion, and
wherein the lens module comprises at least two lens assemblies connected in serial from a front side to a rear side; the lens assembly comprises an assembly lens barrel and a lens mounted inside the assembly lens barrel; all the assembly lens barrels are sequentially fitted over one another to form the lens barrel; and a dustproof ring is provided between adjacent assembly lens barrels.

2. The miniature projection device of claim 1 wherein the front dustproof cushion and/or the rear dustproof cushion is/are made of dustproof foam, non-woven fabric or silica gel.

3. The miniature projection device of claim 1, characterized in that, the front dustproof cushion and/or the rear dustproof cushion is/are of a single layer structure, respectively, or of a laminated structure including at least two layers laminated together, respectively.

4. The miniature projection device of claim 1 wherein a surface of the front dustproof cushion contacting the display region frame is a plane or a curved surface, and a surface of the front dustproof cushion contacting the edge of the front opening is a plane or a curved surface; and/or
a surface of the rear dustproof cushion contacting the window is a plane or a curved surface, and a surface of the rear dustproof cushion contacting the edge of the rear opening is a plane or a curved surface.

5. The miniature projection device of claim 1 comprising the left lens module and the right lens module, wherein the display module comprises a left display region and a right display region corresponding to the left lens module and the right lens module, respectively; and
wherein the lens barrels of the left lens module and the right lens module are independent with respect to each other, such that a lens of the left lens module is packaged in a left sealed space enclosed by a lens barrel of the left lens module, a window at a corresponding side and the display module, the left display region being located in the left sealed space, and a lens of the right lens module is packaged in a right sealed space enclosed by a lens barrel of the right lens module, a window at a corresponding side and the display module, the right display region being located in the right sealed space.

6. The miniature projection device of claim 1 comprising the left lens module and the right lens module, wherein the display module comprises a left display region and a right display region corresponding to the left lens module and the right lens module respectively; and
wherein a light barrier is provided between the left and right display regions of the display module;

wherein lens barrels of the left lens module and the right lens module are provided with recesses to match with the light barrier;

wherein recessed frames of the lens barrels are overlapped with each other in the front-to-rear direction such that the lens barrels run through at their respective recess frames; and wherein an intermediate dustproof cushion is provided between the recess frames of the lens barrels.

7. The miniature projection device of claim 1 further comprising a diopter adjusting mechanism configured to drive the display module to slide in the front-to-rear direction, wherein among all the assembly lens barrels that are connected in serial to form the lens barrel, at least one assembly lens barrel from the assembly lens barrel at the front-most position forms a movable lens barrel of the lens barrel, and the remaining assembly lens barrels form a fixed lens barrel of the lens barrel, the movable lens barrel being fixedly mounted to the display module along the front-to-rear direction and the fixed lens barrel being fixedly mounted to the housing along the front-to-rear direction and further comprising an overlapped width configured to allow the fixed and movable lens barrels to sleeve within one another, wherein the assembly meets the following condition: when the movable lens barrel moves to the front-most position together with the display module, the dustproof ring between the fixed and movable lens barrels remains in a state of being sandwiched between the fixed and movable lens barrels.

8. The miniature projection device of claim 1 further comprising a diopter adjusting mechanism configured to drive the display module to slide in the front-to-rear direction;

wherein the lens module is fixedly mounted to the housing along the front-to-rear direction; and wherein a thickness of the front dustproof cushion in the front-to-rear direction meets the following condition: when the display module moves to the front-most position, the front dustproof cushion remains in a state of being sandwiched between the edge of the front opening of the lens barrel and the display region frame of the display module.

9. The miniature projection device of claim 1 comprising the left lens module and the right lens module, wherein the display module comprises a left display region and a right display region corresponding to the left lens module and the right lens module respectively; and wherein the miniature projection device further comprises an interpupillary distance adjusting mechanism configured to drive the left lens module and the right lens module to move in a left and right direction.

* * * * *